United States Patent
Choi et al.

(10) Patent No.: US 9,955,064 B2
(45) Date of Patent: Apr. 24, 2018

(54) MOBILE TERMINAL AND CONTROL METHOD FOR CHANGING CAMERA ANGLES WITH RESPECT TO THE FIXED BODY

(71) Applicant: LG ELECTRONICS INC., Seoul (KR)

(72) Inventors: Jiyoun Choi, Seoul (KR); Eunji Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 14/660,502

(22) Filed: Mar. 17, 2015

(65) Prior Publication Data
US 2016/0080639 A1    Mar. 17, 2016

(30) Foreign Application Priority Data
Sep. 15, 2014 (KR) .................. 10-2014-0122225

(51) Int. Cl.
    *H04N 5/232*    (2006.01)
    *H04N 5/262*    (2006.01)

(52) U.S. Cl.
    CPC ..... *H04N 5/23212* (2013.01); *H04N 5/23216* (2013.01); *H04N 5/23232* (2013.01); *H04N 5/2625* (2013.01)

(58) Field of Classification Search
    CPC ........... H04N 5/23212; H04N 5/23216; H04N 5/23232; H04N 5/23248–5/2329; H04N 5/23293; H04N 5/2625; G06F 3/04817; G06K 9/00221
    See application file for complete search history.

(56) References Cited

U.S. PATENT DOCUMENTS

| | | | |
|---|---|---|---|
| 7,801,431 B2* | 9/2010 | Wang ................ | H04N 5/23212 348/231.99 |
| 2007/0263113 A1 | 11/2007 | Baek et al. | |
| 2008/0101728 A1* | 5/2008 | Vitsnudel ................ | G06T 5/50 382/317 |
| 2008/0131019 A1* | 6/2008 | Ng ........................... | G06T 5/50 382/255 |
| 2009/0207282 A1* | 8/2009 | Sasaki ................... | H04N 5/232 348/240.3 |
| 2010/0020221 A1* | 1/2010 | Tupman .............. | G06F 3/04883 348/333.01 |
| 2014/0168471 A1 | 6/2014 | Lay et al. | |
| 2014/0192233 A1* | 7/2014 | Kakkori ................ | H04N 5/265 348/239 |

FOREIGN PATENT DOCUMENTS

| | | |
|---|---|---|
| EP | 2 698 984 A2 | 2/2014 |
| EP | 2 733 921 A1 | 5/2014 |

* cited by examiner

*Primary Examiner* — Dennis Hogue
(74) *Attorney, Agent, or Firm* — Birch, Stewart, Kolasch & Birch, LLP

(57) ABSTRACT

A mobile terminal including a display unit; a camera configured to capture an image; and a controller configured to control the camera to capture a plurality of images in response to an image capture request, and generate an image including a focused particular graphic object and at least some out of focus portions excluding the focused particular graphic object by combining at least two of the plurality of images.

14 Claims, 18 Drawing Sheets

FIG. 5A(a)
FIG. 5A(b)
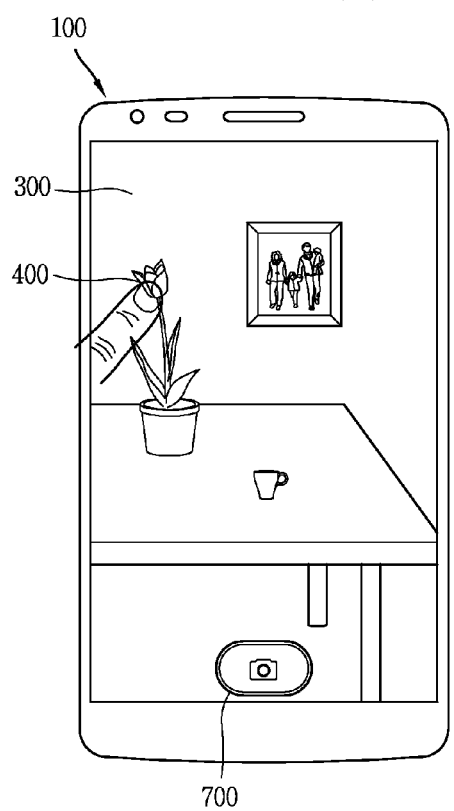
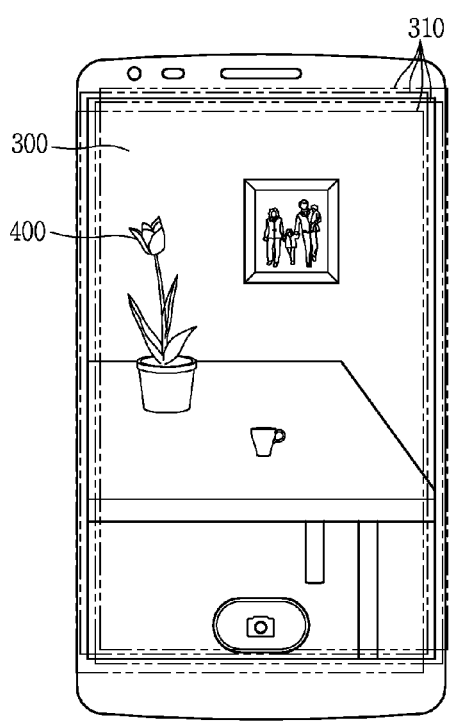

*FIG. 6A(a)* *FIG. 6A(b)*
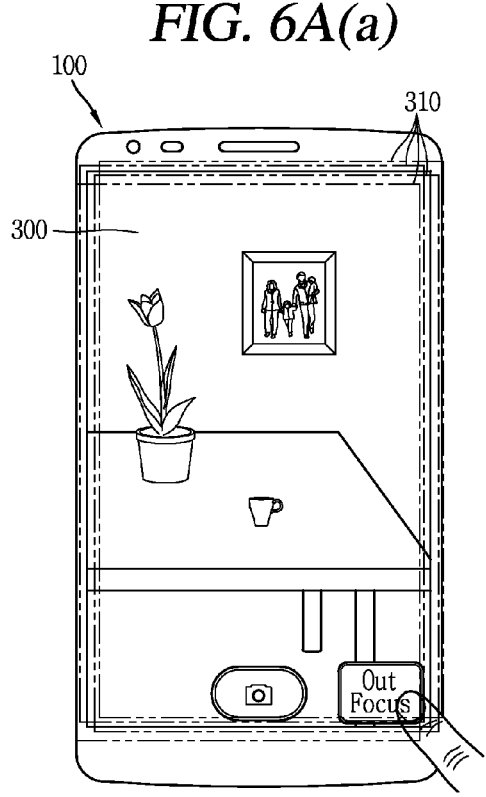
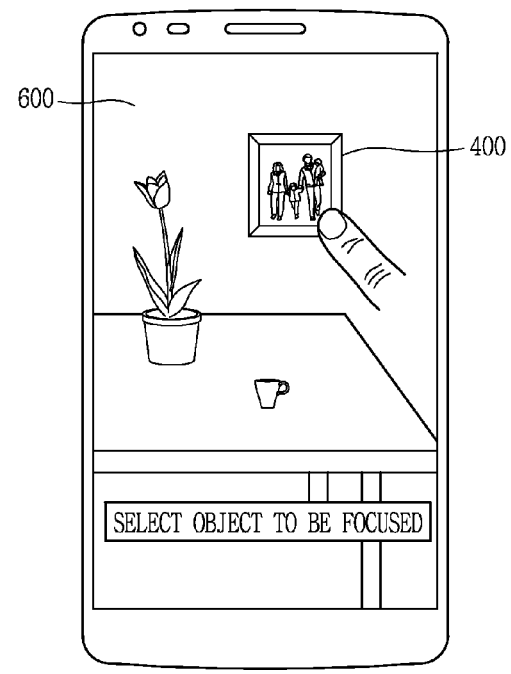

*FIG. 6B(a)* *FIG. 6B(b)*
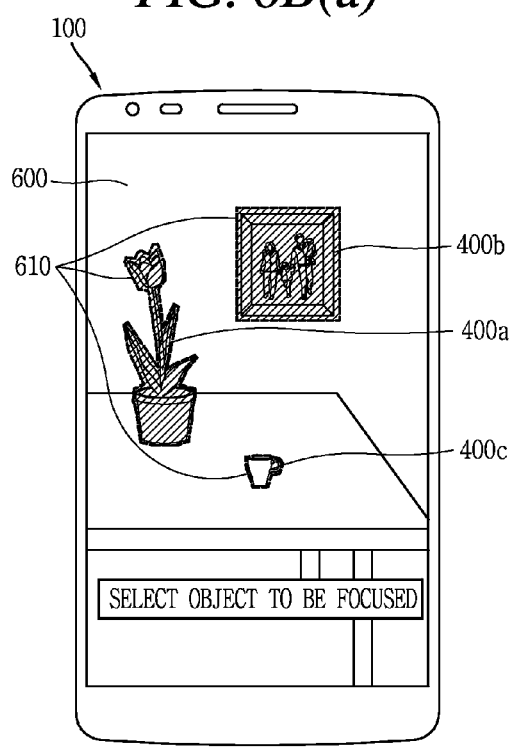
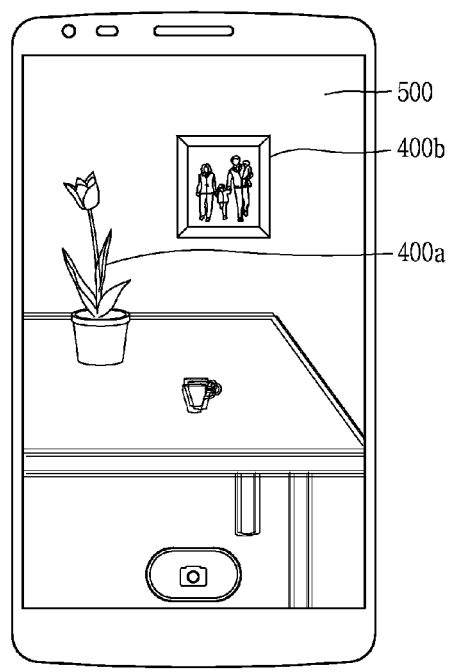

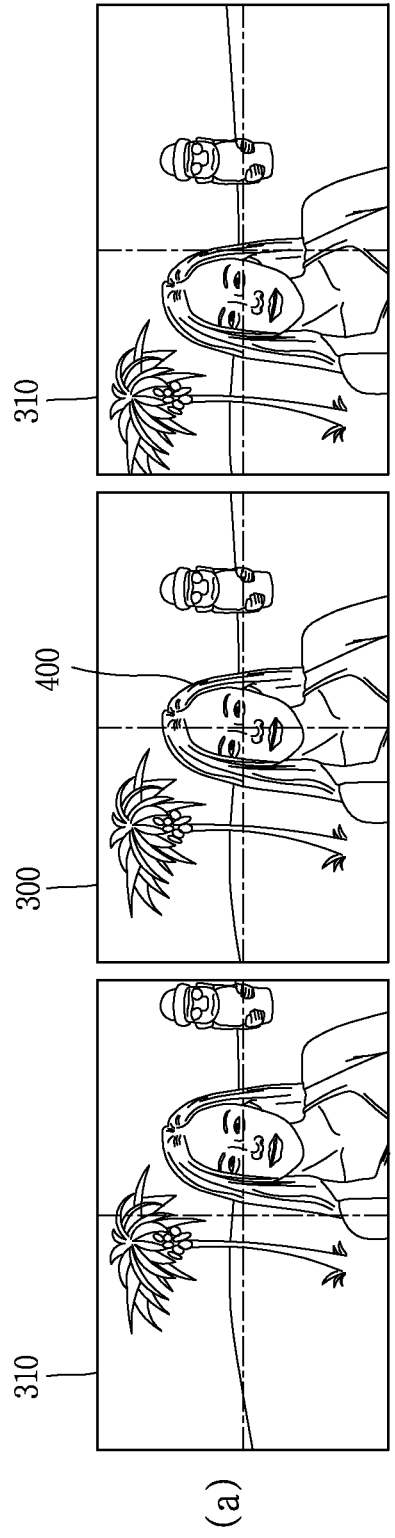

MOBILE TERMINAL AND CONTROL METHOD FOR CHANGING CAMERA ANGLES WITH RESPECT TO THE FIXED BODY

CROSS-REFERENCE TO RELATED APPLICATION

Pursuant to 35 U.S.C. § 119(a), this application claims the benefit of earlier filing date and right of priority to Korean Application No. 10-2014-0122225, filed on Sep. 15, 2014, the contents of which is incorporated by reference herein in its entirety.

BACKGROUND OF THE INVENTION

1. Field of the Invention

The present disclosure relates to a mobile terminal having an image capture function and a control method thereof.

2. Background of the Invention

Terminals may be generally classified as mobile/portable terminals or stationary terminals. Mobile terminals may also be classified as handheld terminals or vehicle mounted terminals. As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device using hardware or software. For example, a user interface environment allowing users to easily and conveniently search for and select functions is provided. Also, as resolution and functions of cameras provided in mobile terminals have enhanced, utilization of cameras provided in mobile terminals has increased.

SUMMARY OF THE INVENTION

Accordingly, an aspect of the present invention is to address the above-noted and other problems.

Another aspect of the present invention is to provide a mobile terminal capable of providing an out of focus image, and a control method thereof.

Another aspect of the present invention is to provide a mobile terminal capable of providing an optimized graphic user interface (GUI) to allow a user to adjust focus on a desired subject, and a control method thereof.

To achieve these and other advantages and in accordance with the purpose of this specification, as embodied and broadly described herein, a mobile terminal may include: a display unit; a camera configured to capture an image; and a controller configured to control the camera to capture a plurality of images in response to an image capture request, and to generate an image in which a particular graphic object included in the plurality of images is focused by using the plurality of captured images, wherein the generated image is an image in which portions, excluding the particular graphic object, are outfocussed by combining at least two of the plurality of images.

In an embodiment of the present disclosure, a preview image input through the camera may be output on the display unit, and the controller may process a preset type touch applied to a region in which the preview image is output, as an image capture request.

In an embodiment of the present disclosure, when the preset type touch is applied to the particular graphic object included in the preview image, the controller may generate an image in which the particular graphic object to which the preset type touch has been applied is focused.

In an embodiment of the present disclosure, when the preview image input through the camera satisfies a preset condition, the controller may capture the plurality of images, and the preset condition may include at least one of a case in which a subject corresponding to at least one of graphic objects included in the preview image is within a preset distance and a case in which at least one of graphic objects included in the preview image is recognized as a face.

In an embodiment of the present disclosure, an icon indicating that the output preview image satisfies the preset condition may be output on the display unit, and the plurality of images may be captured based on a touch applied to the icon.

In an embodiment of the present disclosure, the plurality of captured images may be different from the preview image input through the camera and output on the display unit.

In an embodiment of the present disclosure, in order to capture the plurality of images different from the preview image, the controller may control the camera to be changed at preset angles to capture images by a preset number of times.

In an embodiment of the present disclosure, when the plurality of images are captured, the controller may output any one among the plurality of captured images such that a graphic object to be focused is selected, and the controller may generate an image in which a graphic object to which a touch has been applied, among graphic objects, included in the any one output image, is focused.

In an embodiment of the present disclosure, an indicator for inducing selection of at least one graphic object may be displayed in the any one output image.

In an embodiment of the present disclosure, the image in which the particular graphic object is focused may be generated by extracting the particular graphic object from any one of the plurality of captured images, combining at least two of the plurality of images, and matching the extracted particular graphic object to the combined image.

In an embodiment of the present disclosure, the particular graphic object included in the generated image may be changed according to an image in which the particular graphic object is extracted among the plurality of images.

To achieve these and other advantages and in accordance with the purpose of this specification, as embodied and broadly described herein, a method for controlling a mobile terminal may include: outputting a preview image input through a camera; capturing a plurality of images in response to an image capture request; and generating an image in which a particular graphic object included in the plurality of images is focused by using the plurality of captured images, wherein the generated image may be an image in which portions, excluding the particular graphic object, are outfocussed by combining at least two of the plurality of images.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
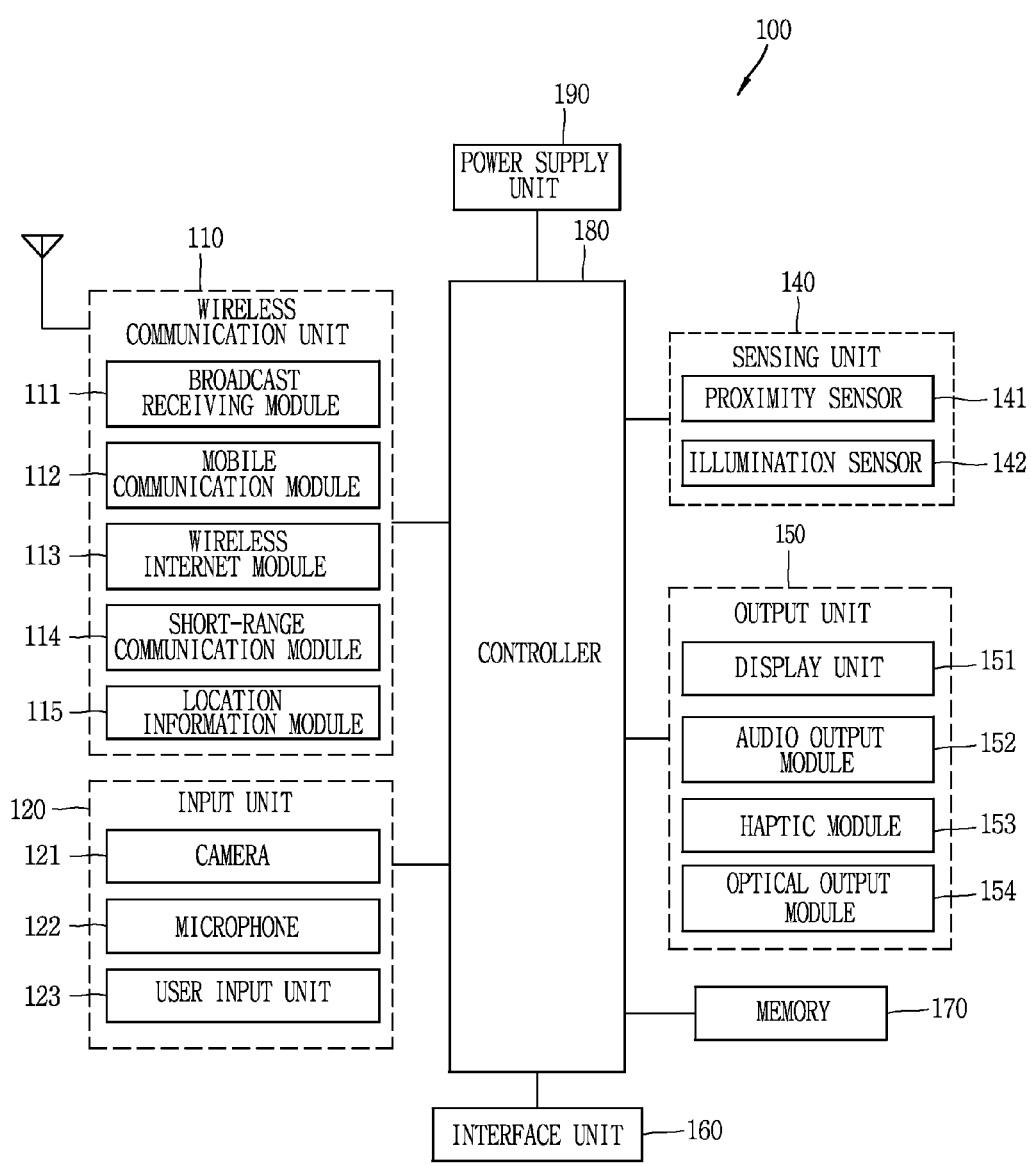
FIG. 1A is a block diagram of a mobile terminal according to an embodiment of the present disclosure.
Figure 1B:
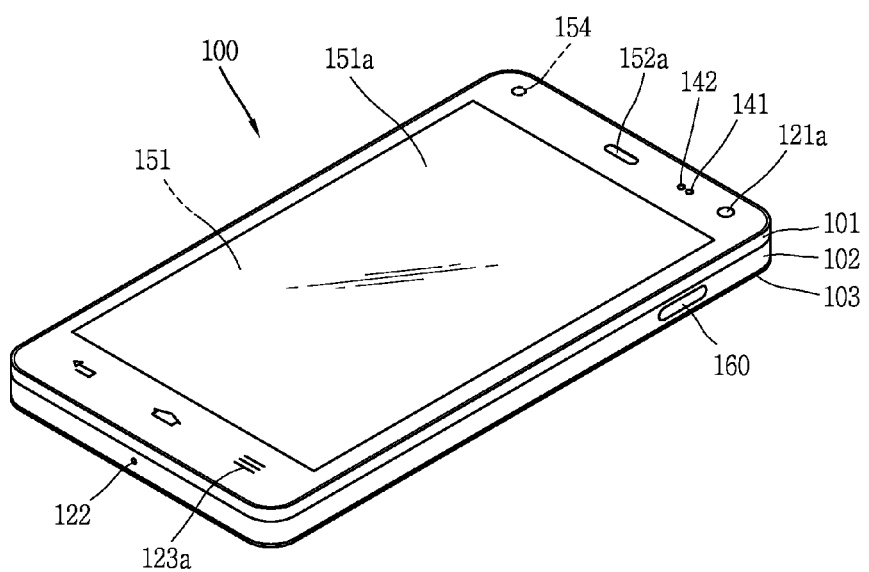
FIGS. 1B and 1C are conceptual views of one example of the mobile terminal, viewed from different directions.
Figure 1C:
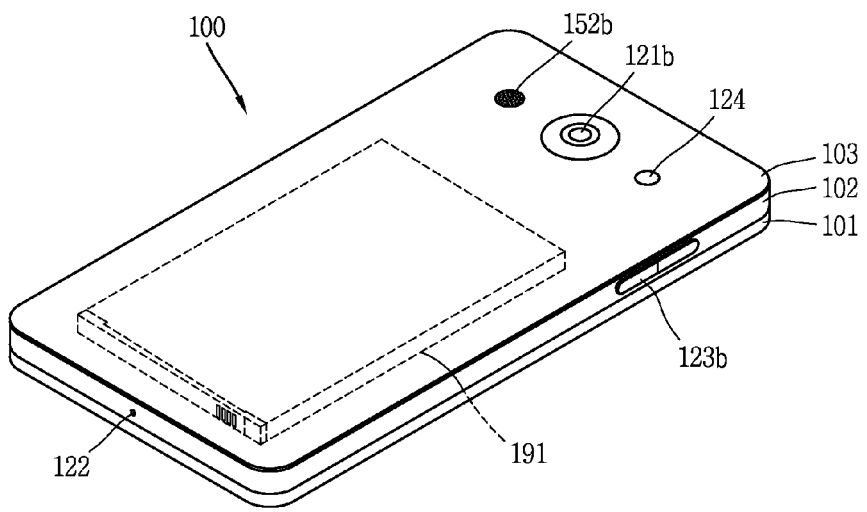

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100.

In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals.

The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port.

In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include the display unit 151, the first audio output module 152*a*, the second audio output module 152*b*, the proximity sensor 141, the illumination sensor 142, the optical output module 154, the first camera 121*a*, the second camera 121*b*, the first manipulation unit 123*a*, the second manipulation unit 123*b*, the microphone 122, the interface unit 160, etc.

Hereinafter, the mobile terminal 100 will be explained with reference to FIGS. 1B and 1C. The display unit 151, the first audio output module 152*a*, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia. It may be configured such that the sounds generated from the first audio output module 152a are released along an assembly gap between the structural bodies (e.g., between the window 151a and the front case 101). In this instance, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the mobile terminal 100 according to an embodiment of the present disclosure including one more of the components described above may execute an image capture function. The image capture function may be executed based on selection of an icon (or a touch applied to the icon) associated with the image capture function (or an icon of an application). When the image capture function is executed through the icon, the display unit 151 may be in an ON state.

Further, as well as being executed when the icon associated with the image capture function, the image capture function may also be executed when at least one of keys (for example, at least one of a hardware key and a software key) provided in the mobile terminal 100. In this instance, even though the display unit 151 is in an OFF state, the controller 180 can execute the image capture function in response to selection of a key provided in the mobile terminal 100.

In the mobile terminal 100 according to an embodiment of the present disclosure, an image received (or input) through the camera 121 according to execution of the image capture function may be displayed on the display unit 151. In more detail, the mobile terminal 100 may display an image received through the camera 121 on the display unit 151 in real time. Here, the image received through the camera 121 may also be referred to as a "preview image," an "image," and the like.

The execution of the image capture function may refer to execution of an application driven to capture an image. When the image capture function is executed, the controller 180 can activate the camera 121 to be ready to capture an image. Also, the controller 180 can output an image input through the activated camera 121 on the display unit 151. Here, in the present disclosure, the image output to the display unit 151 is defined as a "preview image." Also, when an image capture operation is performed based on a user selection, the controller 180 can store a preview image 300 being output on the display unit 151, in the memory 170.

The mobile terminal 100 according to an embodiment of the present disclosure provides an image capture function to store an image (a preview image) received through the camera 121 in the memory 170. Here, the operation of storing, by the mobile terminal 100, an image received through the camera 121 in the memory 170 may be expressed as "capturing an image," "obtaining an image," "capturing a preview image," "processing an image capture command regarding a preview image," "performing an image capture function on a preview image," and the like. Also, without being restricted to the above-mentioned expressions, any expression may be freely used such that an image received through the camera 121 is stored in the memory 170 or associated memory.

In an embodiment, the mobile terminal 100 may perform an image capturing operation based on a user selection. Such a user selection may be expressed as a "user control command" or a "control command." A user selection may be performed in various manners. For example, the user can perform an image capturing operation by touching or pressing a hardware key provided in the mobile terminal 100 or by touching at least one of a software key and a visual key output on the display unit 151.

Namely, when a hardware key associated with the image capture function is touched or pressed or when at least one of the software key and the visual key output on the display unit 151 is touched, the controller 180 can determine that a user control command for performing the image capture function has been received. Based on such a control command, the controller 180 can capture an image input through the camera 121. Also, in addition to these examples, the image capture function may be performed when a user voice corresponding to a pre-set command is received, when a particular gesture is applied to the mobile terminal 100, or when a movement previously set in the mobile terminal 100 is sensed.

Meanwhile, the preview image 300 (see FIG. 3A, for example) output on the display unit 151 may include at least one graphic object. The at least one graphic object output on the preview image 300 may refer to a subject (or an object) desired to be captured by the user with the camera 121. Namely, the preview image 300 may include at least one graphic object 400, and the graphic object 400 may refer to a subject (or an object) included in an image received through the camera 121.

Meanwhile, the mobile terminal 100 may capture a plurality of images in response to an image capture request. In more detail, the controller 180 can capture a plurality of images based on a single user selection (a user control command). Here, the function to capture a plurality of images corresponds to a continuous image capture function to capture the plurality of images. The continuous image capture function may refer to capturing images several times based on a single touch applied to a graphic object (or an icon) associated with an image capture function regarding a preview image, rather than capturing images several times according to a plurality of touches applied to the graphic object (or the icon) associated with the image capture function regarding the preview image.

Figure 4A:
FIGS. 4A(a) to 4B(b) are conceptual views illustrating a method for capturing a plurality of images.
Figure 4A:
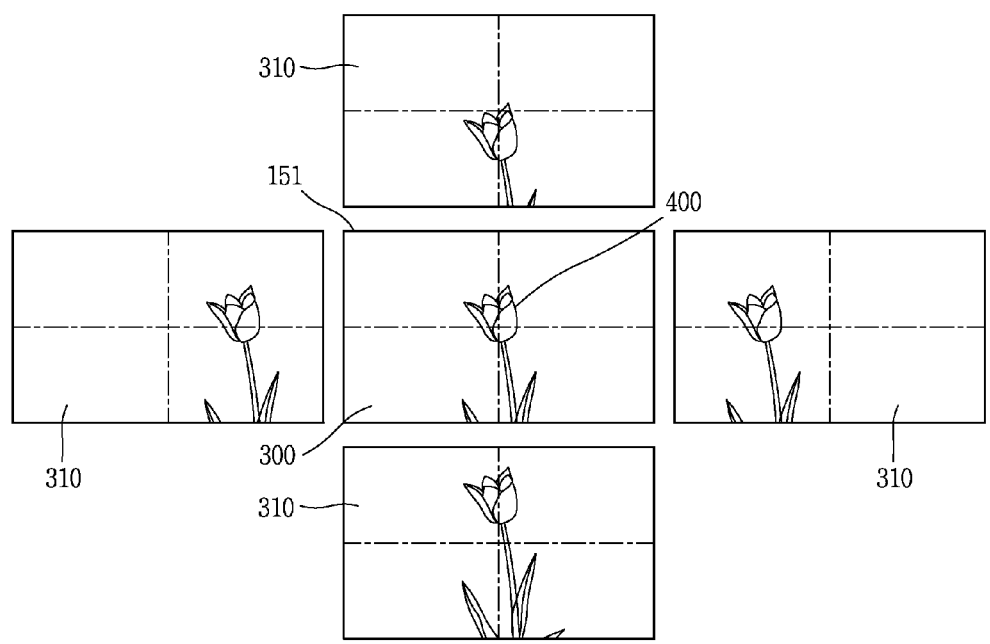

Here, the plurality of images 310 may include the preview image 300 input through the camera 121 and output on the display unit 151, and at least one image different from the preview image 300 (the method of capturing a plurality of images will be described with reference to FIGS. 4A and 4B hereinafter).

Here, the plurality of images may include an image obtained by capturing the preview image 300 displayed on the display unit 151 and at least one image 310 captured by moving the camera 121 by a preset distance in a preset direction with respect to the preview image 300. Hereinafter, the captured preview image and the at least one image captured by moving the camera 121 will be referred to as a plurality of images 310 or a plurality of captured images 310.

Figure 5A:
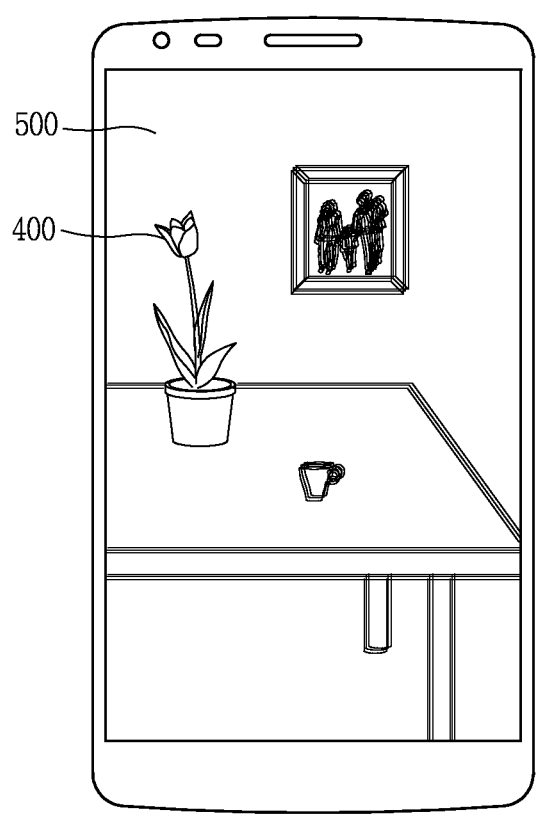
FIGS. 5A(a) to 5C(b) are conceptual views illustrating a method of capturing a plurality of images in response to an image capture request.

All of the plurality of captured images may be stored in the memory 170 or the plurality of captured images may be selectively stored, or the plurality of captured images may be temporarily stored to generate an out of focus image 500 (FIG. 5A(c), for example), and thereafter, when the generation of the out of focus image 500 is completed, the plurality of captured images may be deleted from the memory 170.

The controller 180 can recognize a particular graphic object to be focused by using the plurality of images 310. In more detail, the controller 180 can extract a depth value and a distance value of each pixel by using at least two images among the plurality of images 310. The controller 180 can recognize the graphic object 400 included in the plurality of images 310. For example, the graphic object 400 may be recognized based on pixels having the same/similar depth value and distance value among pixels constituting the captured images. In more detail, the controller 180 can select pixels having the same/similar distance value or depth value by using at least one of the depth value and the distance value extracted by using the at least two images, and combine the selected pixels to recognize (or extract) the graphic object (subject).

Also, the controller 180 can recognize the graphic object included in the preview image 300 through various schemes such as an image analysis scheme, a face recognition scheme, and the like, as well as through the scheme of using the depth value or the distance value (in this instance, however, a specific performing method regarding the image analysis scheme and the face recognition scheme can be used).

When the preview image 300 or at least one of the plurality of captured images 310 is output, and when a touch is applied to the graphic object included in the image, the controller 180 can recognize (extract) the graphic object by using the method described above. Here, the touch-applied graphic object may refer to the particular graphic object 400 which is to be focused hereinafter.

The controller 180 can generate an image in which the particular graphic object 400 included in the plurality of images is focused, by using the plurality of images. Here, the particular graphic object 400 may be a graphic object to which a touch has been applied when the preview image 300 is output, a graphic object automatically focused according to preset conditions, or a graphic object selected according to a user request after the plurality of images are captured. In more detail, when the particular graphic object is focused, it means that other portions excluding the particular graphic object are out of focus. Here, outfocussing may be applying a dimming effect or a blur effect.

Hereinafter, an image in which a particular graphic object is focused or an image in which portions excluding the particular graphic object are out of focus (or outfocussed), and an image generated by using a plurality of images will be referred to as the "out of focus image 500."

Figure 2:
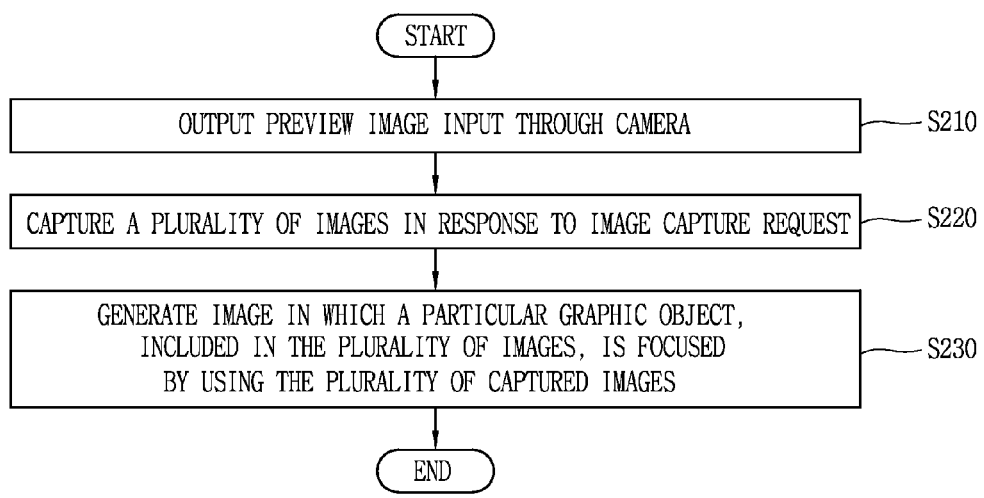
FIG. 2 is a flow chart illustrating a control method of an embodiment of the present disclosure.
Figure 3A:
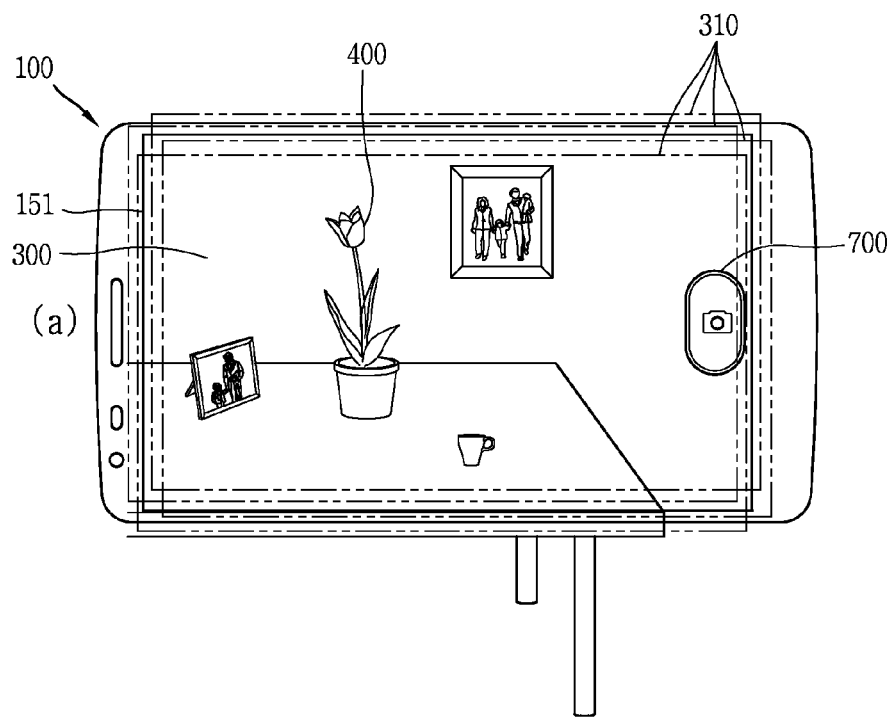
FIGS. 3A and 3B are a conceptual view illustrating the control method of FIG. 2.
Figure 3B:
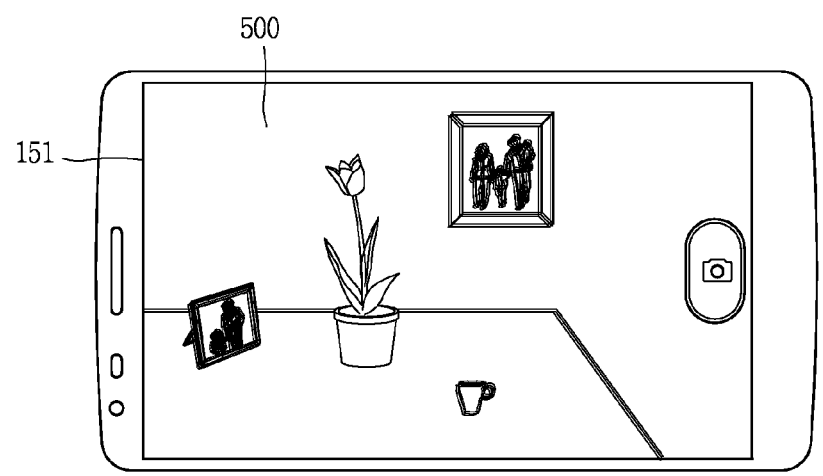

Hereinafter, a method for capturing a plurality of images and a method for generating an image in which a particular graphic object included in a plurality of captured images is focused by using the plurality of images will be described in detail with reference to the accompanying drawings. In particular, FIG. 2 is a flow chart illustrating a control method and FIGS. 3A and 3B are conceptual views illustrating a control method of FIG. 2. Further, FIGS. 4A and 4B are conceptual views illustrating a method for capturing a plurality of images.

First, an image capture function is executed based on a user request. As the image capture function is executed, the preview image 300 input through the camera 121 may be output to the display unit 151 in step S210. As described above, the preview image 300 may include at least one graphic object 400, and the graphic object 400 may refer to a subject (or an object) included in the image received through the camera 121.

Next, in response to an image capture request, a plurality of images 310 are captured in step S220. As described above, the image capture request may refer to a user control command to perform an image capturing operation. The image capture request may be performed in various manners. For example, as illustrated in FIG. 3A, the image capture request may be made by touching an image capture button 700 output on the preview image 300. In another example, the controller 180 can process a touch applied to one region of the region in which the preview image 300 is output, as the image capture request. That is, even though a touch is not applied to the separate image capture button 700, the controller 180 can capture the preview image 300 based on a touch applied to one region of the region in which the preview image 300 is output. In this instance, the image capture button 700 can be not displayed.

Figure 5B:
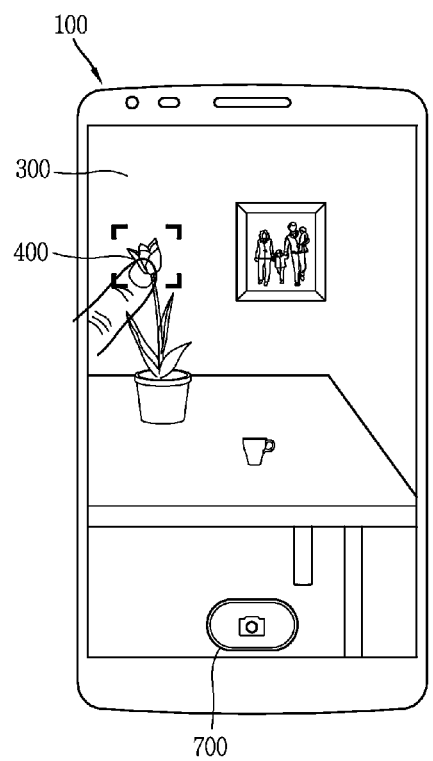
Figure 5B:
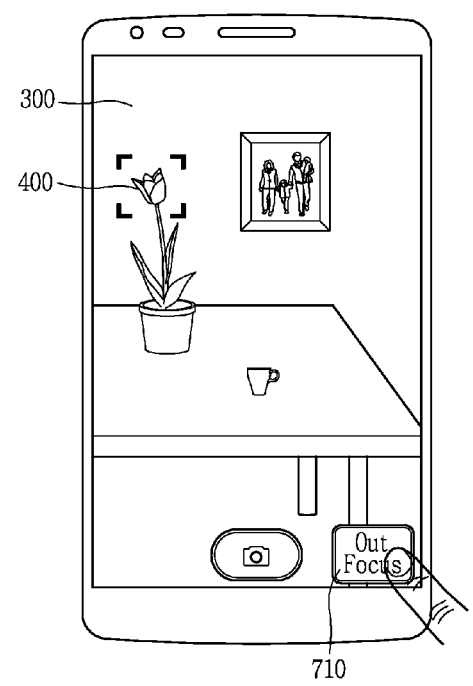
Figure 5B:
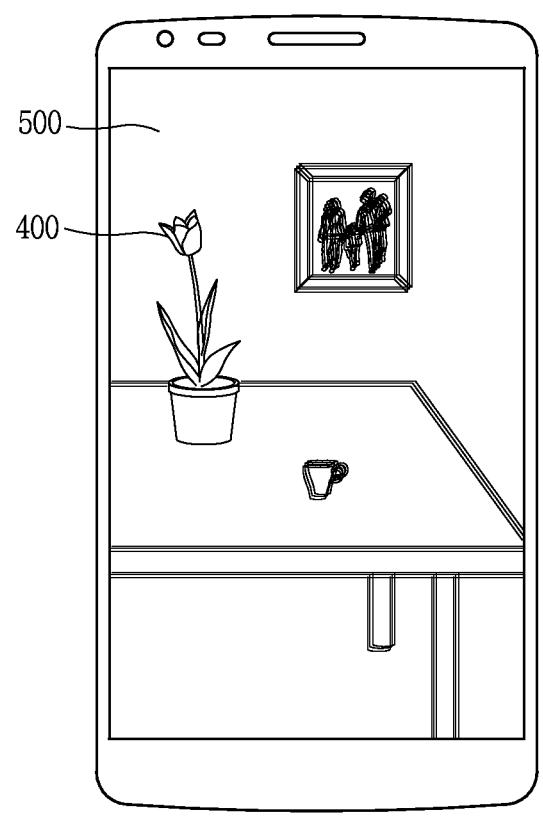

Also, the image capture request may be made when a touch is applied to an icon 710 (FIG. 5B(b)) associated with a function to capture a plurality of images, rather than the image capture button 700. Application of a touch to the icon 710 associated with the function of capturing a plurality of images will be described in detail hereinafter.

Meanwhile, the controller 180 can capture a plurality of images 310 in response to an image capture request. As described above, the plurality of captured images 310 include all of the image obtained by capturing the preview image 300 and at least one image 310 captured by moving the camera 121 from the preview image 300 by a preset distance in a preset direction. For example, as illustrated in FIG. 3A, based on an applied image capture request, the controller 180 can capture the preview image 300 displayed on the display unit 151 and a plurality of images 310.

A method for capturing the plurality of images will be described in detail with reference to FIGS. 4A and 4B. Referring to FIG. 4A, the mobile terminal 100 according to an embodiment of the present disclosure may provide an optical image stabilization (OIS) function. The OIS function refers to a function to move the camera 121 in a direction opposite to the direction in which the mobile terminal 100 has been vibrated, when vibration of the mobile terminal 100 was sensed by the user while an image was being captured, thereby preventing vibration of an image in capturing the image.

The mobile terminal 100 according to an embodiment of the present disclosure uses the OIS function reversely such that the camera 121 is finely moved when the body of the mobile terminal 100 is fixed. Namely, the controller 180 can move the camera 121 in a preset direction or change the camera 121 to a preset angle. In order to capture a plurality of images 310 different from the preview image 300, the controller 180 can control the camera 121 to capture images a preset number of times, while changing the camera 121 to the preset angle. Accordingly, the plurality of captured images 310 may have a difference from the preview image 300 output from the display unit 151.

In more detail, the camera 121 according to an embodiment of the present disclosure may include a lens and a deformation member. The deformation member may adjust an angle of the lens with respect to the terminal body. In more detail, the deformation member may be an elastic member including a spring, a rubber band, and the like, may be a member that can be deformed by using air pressure, or may include a prism, or the like, for changing an angle. When an image capture request is received, the controller 180 can deform the deformation member to change an angle of the lens.

In another example, an angle of the camera 121 including at least one of the lens and the deformation member may be changed by an external member. The external member may be configured to change a direction of the components (i.e., the lens and the deformation member) of the camera 121 or an angle of the camera 121. In an embodiment of the present disclosure, a limitation of the formation member in changing the degree of an angle may be resolved by the external member.

Referring back to (b) of FIG. 4A, a plurality of images 300 and 310 captured a preset number of times by changing the camera 121 at preset angles are illustrated. The particular graphic object (subject) 400 included in the plurality of captured images 300 and 310 may be captured in different positions as the angle of the camera 121 is changed.

In more detail, when the angle of the camera 121 is changed to correspond to a left direction, the particular graphic object 400 is positioned relatively in a right direction. Also, when the angle of the camera 121 is changed to correspond to the right direction, the particular graphic object 400 is positioned relatively in the left direction. This may be applied in the same manner in a vertical or diagonal direction.

Figure 4B:
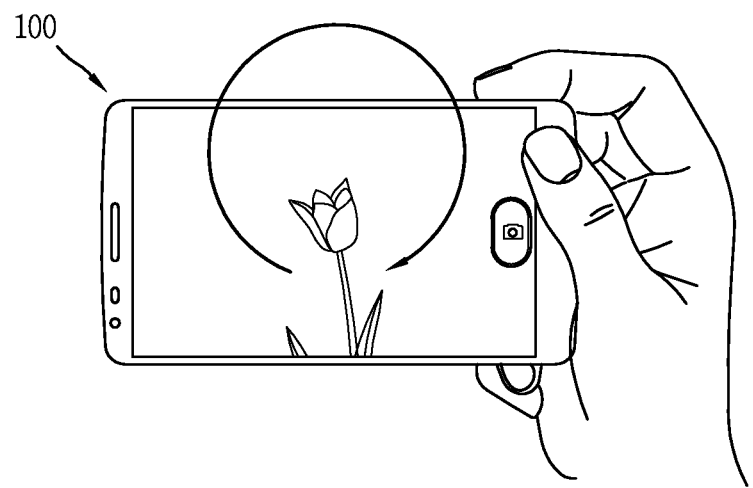
Figure 4B:
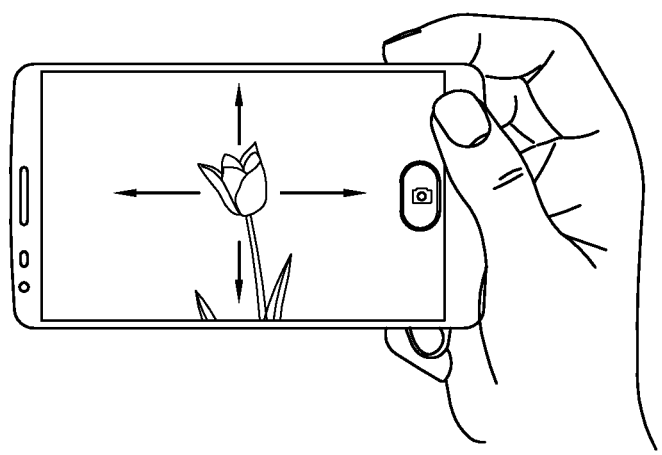

In another example, as illustrated in FIG. 4B, the plurality of images 300 and 310 may be captured as the mobile terminal 100 itself is moved by the user or by an external force. In more detail, while a continuous image capture function is being performed in the mobile terminal 100, when the mobile terminal 100 moves, the mobile terminal 100 may capture a plurality of different images 300 and 310. Hereinafter, the plurality of images 300 and 310 will be collectively denoted by reference numeral 310.

When the plurality of images 310 are captured, an image in which the particular graphic object 400 is focused is generated by the plurality of captured images 310 in step S230. In more detail, the controller 180 can combine at least two of the plurality of images 310 to generate the image 500 in which portions other than the particular graphic object 400 are out of focus (a method for performing outfocussing will be described in detail with reference to FIGS. 7A and 7B). In step S230, as illustrated in FIG. 3B, the image in which the particular graphic object 400 is focused on the display unit 151 and portions other than the particular graphic object 400 are out of focus may be output on the display unit 151.

Through this configuration, in an embodiment of the present disclosure, continuous image capturing is performed by using the single camera 121, and by using the plurality of images captured through the continuous image capturing, the image in which the particular graphic object 400 is focused and portions other than the particular graphic object 400 are out of focus may be generated. Thus, the present disclosure satisfies the user's need to capture an out of focus image through the mobile terminal 100.

Figure 5C:
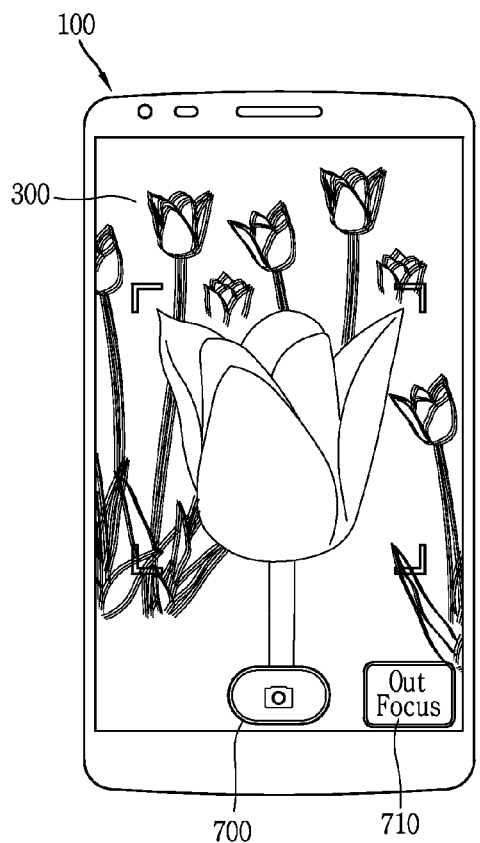
Figure 5C:
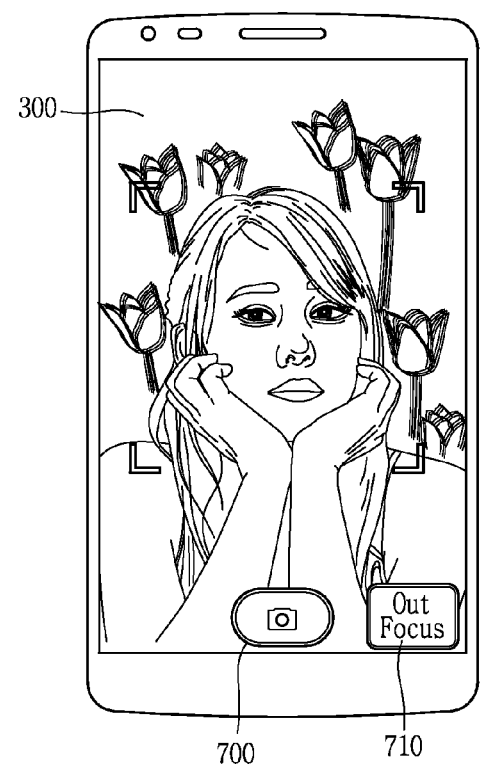

Hereinafter, a method for capturing a plurality of images will be described in detail with reference to the accompanying drawings. In particular, FIGS. 5A, 5B and 5C are conceptual views illustrating a method of capturing a plurality of images in response to an image capture request.

In response to an image capture request, the controller 180 can control the camera 121 to capture a plurality of images. Here, the image capture request may be made by touching the image capture button 700 output on the preview image 300. When the mobile terminal 100 enters a continuous image capture mode or the preview image 300 satisfies a preset condition, and when a touch is applied to the image capture button 700, the controller 180 can capture a plurality of images. The preset condition may refer to at least one of conditions required for the preview image 300 output on the display unit 151 to generate an out of focus image. This will be described in detail with reference to FIGS. 6A and 6B hereinafter.

Meanwhile, when a preset touch is applied to a region in which the preview image 300 is output, the controller 180 can capture a plurality of images. That is, the controller 180 can process the preset type touch applied to the region in which the preview image 300 is output, as the image capture request. The preset type touch may include various types of touches. For example, the preset type touch may include any one among a short touch (or tap), a long touch, a multi-touch, a drag touch, a flick touch, a pinch-in touch, a pinch-out touch, a swipe touch, and a hovering touch.

That is, even though a touch is not applied to the image capture button 700, the controller 180 can capture a plurality of images based on a preset type touch applied to the preview image 300. In this instance, the image capture button 700 may not be output. For example, as illustrated in (a) of FIG. 5A, when a preset type touch is applied to the region of the display unit in which the preview image 300 is output, the controller 180 can capture the plurality of images 300 and 310 as illustrated in (b) of FIG. 5A.

Thereafter, the controller 180 can generate the image 500 in which the particular graphic object 400 included in the plurality of images 300 and 310 is focused by using the plurality of captured images 300 and 310 as shown in (c) of FIG. 5A. Here, the particular graphic object 400 may be positioned in a point to which a preset type touch has been applied as illustrated in (a) of FIG. 5A. That is, when the preset type touch is applied to the particular graphic object 400 included in the preview image 300, the controller 180 can generate the image 500 in which the particular graphic object 400 is focused and portions, excluding the particular graphic object 400, are out of focus.

Meanwhile, in an embodiment of the present disclosure, when a touch is applied to the preview image 300, focusing may be adjusted with the region to which the touch has been applied, as the center. For example, as illustrated in (a) of FIG. 5B, when a touch is applied to any one graphic object 400 among graphic objects included in the preview image 300, focusing may be adjusted with the graphic object 400 to which the touch has been applied, as the center.

Thereafter, when a touch is applied to the image capture button 700, the controller 180 can capture the preview image 300. Here, the captured preview image 300 may be captured as an image in which a depth of field of a subject is high (the degree of outfocussing is weak).

Meanwhile, when a touch is applied to any one graphic object 400 of the graphic objects included in the preview image 300, the controller 180 can output the icon 710 associated with the outfocussing function as illustrated in (b) of FIG. 5B. Here, when a touch is applied to the icon 710, the controller 180 can generate the image 500 in which the graphic object 400 to which the touch has been applied is focused and portions other than the graphic object 400 are out of focus as illustrated in (c) of FIG. 5B.

That is, when a touch is applied to the region in which the preview image 300 is output, the controller 180 can output the icon 710 associated with the continuous image capture function. Thereafter, when a touch is applied to the icon 710, the controller 180 can capture a plurality of image, and generate the image 500 in which the portion of the region in which the preview image is output to which the touch has been applied is focused and other portions are out of focus by using the plurality of images.

Meanwhile, when the preview image 300 displayed on the display unit 151 satisfies a preset condition, the controller 180 can capture a plurality of images. In more detail, when the preview image 300 satisfies a preset condition, the controller 180 can capture a plurality of images in response to an image capture request. The preset condition may include at least one of when a subject corresponding to at least one of graphic objects included in the preview image 300 is within a preset distance and when at least one of graphic objects included in the preview image 300 is recognized as a face.

Meanwhile, in order to determine whether the preview image 300 output on the display unit 151 is available to be outfocussed, the controller 180 can calculate an offset value, and when the offset value exceeds a threshold value, the controller 180 can determine that the preset condition is satisfied.

The offset value may increase as a distance between the camera 121 and a subject decreases, as a distance between the camera 121 and the background increases, as a distance between the subject and the background increases, as similarity between the subject and a different subject in proximity to the subject increases, and as similarity between the subject and the background decreases. That is, when the offset value exceeds a threshold value, the controller 180 can determine that the preset condition is satisfied and capture a plurality of images in response to the image capture request.

That is, when the preview image 300 satisfies the preset condition, the controller 180 can automatically capture a plurality of images in response to the image capture request even without a touch applied to perform continuous image capturing. Meanwhile, when the preview image 300 satisfies the preset condition, the controller 180 can output the icon 710 indicating that the preset condition is satisfied. That is, the icon 710 indicating that the preset condition is satisfied may be the icon 710 associated with the continuous image capture function.

For example, when it is determined that a subject corresponding to the particular graphic object 400 included in the preview image 300 is within a preset distance as illustrated in (a) of FIG. 5C, or when a graphic object included in the preview image 300 is recognized as a face as illustrated in (b) of FIG. 5C, the controller 180 can output the icon 710 associated with the continuous image capture function, and when a touch is applied to the icon 710, the controller 180 can capture a plurality of images and generate the out of focus image 500.

As described above, in an embodiment of the present disclosure, when the preview image 300 satisfies the preset condition, a plurality of images may be captured to generate an out of focus image, or a plurality of images may be captured according to a user request to generate an out of focus image. Thus, the present disclosure can provide a new user interface capable of generating an out of focus image by using a single camera provided in the mobile terminal 100.

Figure 6A:
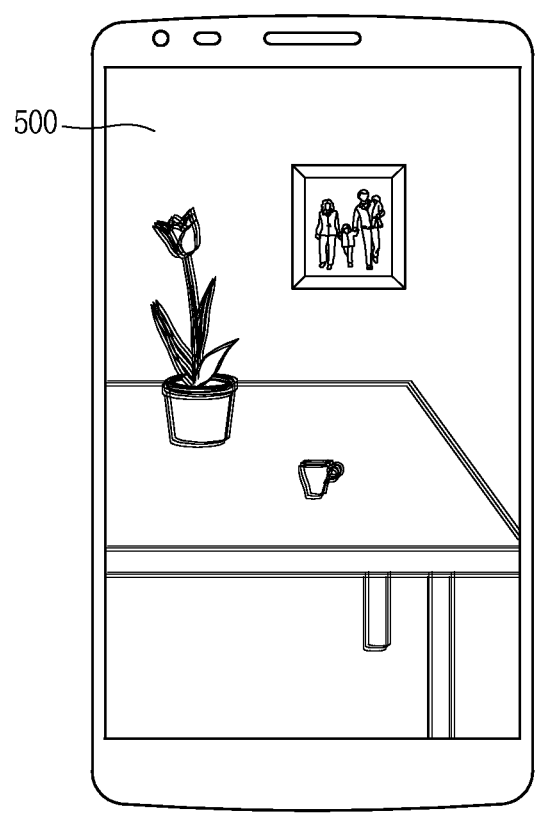
FIGS. 6A(a) to 6B(b) are conceptual views illustrating a method for selecting a graphic object to be focused among graphic objects included in a plurality of images.

Hereinafter, a method for selecting a graphic object to be focused will be described in more detail. FIGS. 6A and 6B are conceptual views illustrating a method for selecting a graphic object to be focused among graphic objects included in a plurality of images.

First, as illustrated in FIGS. 5A and 5B, the controller 180 can adjust focus on a particular graphic object 400 to which a touch has been applied in the preview image 300 before a plurality of images 310 are captured. That is, the controller 180 can select a particular graphic object to be focused before a plurality of images are captured. Also, the controller 180 can select a particular graphic object to be focused by an autofocusing function.

Hereinafter, a method for selecting a graphic object to be focused after a plurality of images are captured will be described. When a plurality of images 310 are captured, the controller 180 can output any one of the plurality of captured images 310 on the display unit 151 such that a graphic object to be focused may be selected. For example, the any one image output on the display unit 151 may be an image obtained by capturing the preview image 300 output on the display unit 151 when the plurality of images 310 are captured.

For example, when a plurality of images are captured as illustrated in (a) of FIG. 6A, the controller 180 can output any one image 600 among the plurality of captured images on the display unit 151 as illustrated in (b) of FIG. 6A. Here, outputting the any one image 600 among the plurality of images on the display unit 151 to select a graphic object to be focused may be expressed as entering a selection mode.

When single image capturing (general image capturing), rather than continuous image capturing, is performed, the controller 180 can not enter the selection mode but continuously output the preview image 300 on the display unit 151. Meanwhile, when a plurality of images are captured, the controller 180 can execute the selection mode.

That is, after the plurality of images are captured, the controller 180 can enter the selection mode to output any one image 600 among the plurality of captured images. Here, when a touch is applied to any one graphic object 400 among graphic objects included in the any one image 600, the controller 180 can generate the image 500 in which the graphic object 400 to which the touch has been applied is focused as illustrated in (c) of FIG. 6A. That is, the controller 180 can generate the image 500 in which portions, other than the graphic object 400 to which the touch has been applied, among the graphic objects included in any one image output in the selection mode, by using a plurality of images.

Meanwhile, as shown in FIG. 6B(a), an indicator 610 for inducing selection of at least one graphic image may be displayed in the any one output image 600. For example, the indicator 610 may have a form indicated to correspond to the edge of the graphic object included in the any one output image 600.

When the selection mode is entered, and when the any one image 600 is output, the controller 180 can extract at least one graphic object based on a distance value extracted by using at least two images among the plurality of images. Also, the controller 180 can output the indicator 610 for inducing selection of at least one of the extracted graphic objects such that the indicator 610 overlaps with the graphic object.

For example, the controller 180 extracts at least one graphic object 400a, 400b, and 400c from the any one image 600 output as the selection mode is entered, and output the indicator 610 for inducing selection of the extracted graphic objects 400a, 400b, and 400c. Thereafter, when a touch is applied to at least one 400a or 400b among the extracted graphic objects 400a, 400b, and 400c, as illustrated in (a) of FIG. 6B, the controller 180 can shade the graphic objects 400a and 400b to which the touch has been applied to indicate that the graphic objects 400a and 400b are selected. Thereafter, as illustrated in (b) of FIG. 6B, the image 500 in which the graphic objects 400a and 400b to which the touch has been applied (or the graphic objects 400a and 400b which have been selected) are focused and other portions are out of focus may be generated and the generated image 500 may be output on the display unit 151.

As described above, the present disclosure provides a novel user interface for selecting a graphic object to be focused, whereby user's needs for adjusting focus on his or her desired graphic object can be satisfied.

Figure 7A:
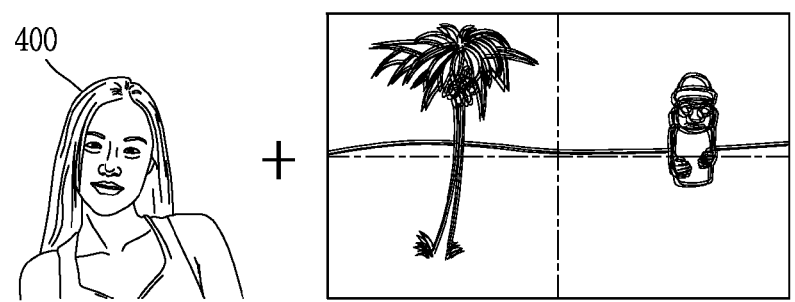
FIGS. 7A(a) to 7B(c) are conceptual views illustrating a method for generating an image in a portion excluding a particular graphic object is outfocussed by using a plurality of images and a method for changing the particular graphic object.
Figure 7A:
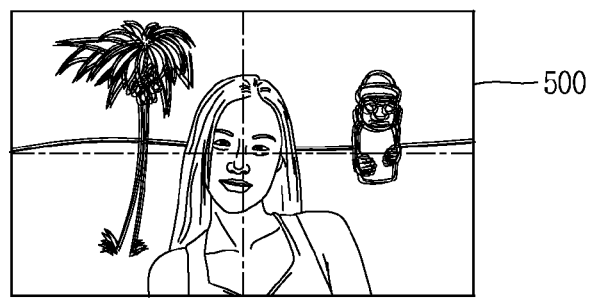
Figure 7B:
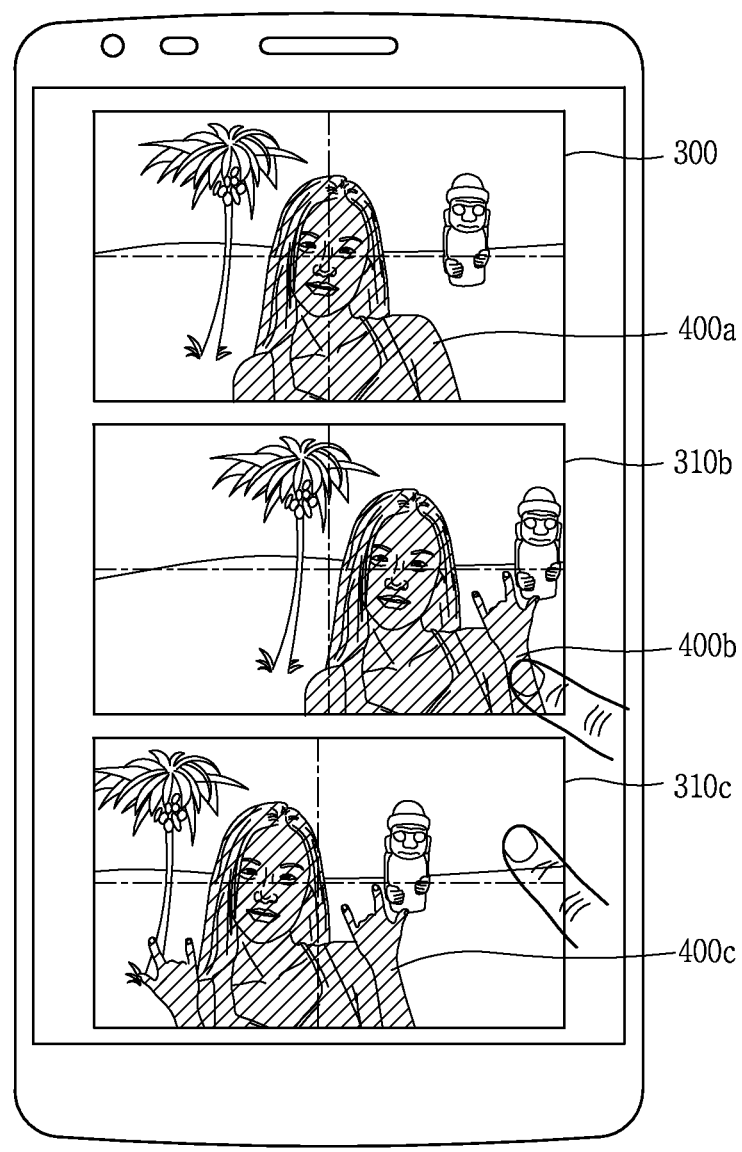
Figure 7B:
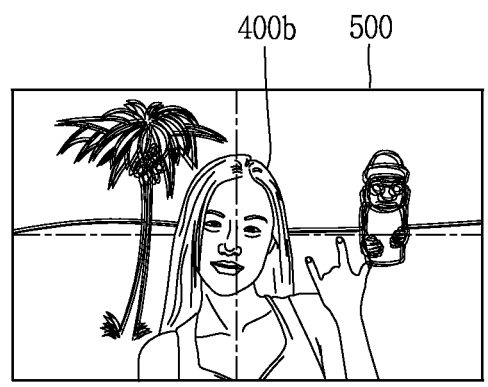
Figure 7B:
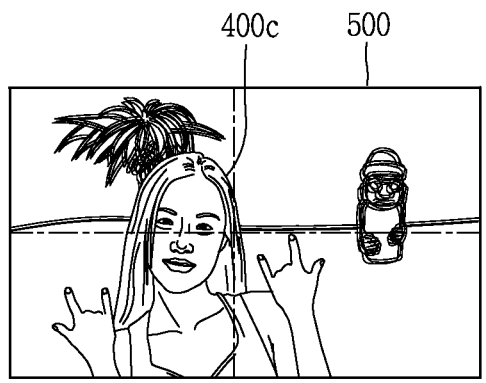

Hereinafter, a method for generating an image in which a particular graphic object is focused and portions other than the particular graphic object is out of focus by using a plurality of images will be described in detail with reference to the accompanying drawings. FIGS. 7A and 7B are conceptual views illustrating a method for generating an image in a portion excluding a particular graphic object is outfocussed by using a plurality of images and a method for changing the particular graphic object.

The controller 180 can extract a distance value of each pixel by using at least two of a plurality of captured images. Also, based on a distance value of a pixel corresponding to a point to which a touch has been applied, the controller 180 can extract pixels having a distance value which is the same as or similar to the extracted distance value to thus extract a graphic object included in the preview image. Thereafter, the controller 180 can process such that the graphic object is focused and portions excluding the graphic object is blurred, thus performing outfocussing.

Meanwhile, the controller 180 can generate an out of focus image by combining at least two of a plurality of images. For example, a plurality of images 300 and 310 different from each other are illustrated. The controller 180 can extract a particular graphic object 400 from any one image 300 among the plurality of images. Also, the controller 180 can extract all of the graphic objects 400 included in the plurality of images 300 and 310, thus separating the particular graphic object 400 from the plurality of images 300 and 310.

The controller 180 can combine the plurality of images, from which the particular graphic objects 400 were separated. As the plurality of images are combined, portions excluding the particular graphic object 400 may be outfocussed. For example, the result of combining the plurality of images from which the particular graphic object 400 was separated may be as shown in (b) of FIG. 7A. That is, when a plurality of images are combined to perform outfocussing, a degree of outfocussing (the degree to which a blur effect is applied) increases as the number of combined images increases.

Thereafter, the controller 180 can match the extracted particular graphic object 400 and the plurality of combined images as illustrated in (b) of FIG. 7A to generate the image 500 in which the particular graphic object 400 is focused and portions, excluding the particular graphic object 400, are out of focus as illustrated in (c) of FIG. 7A.

Thus, in an embodiment of the present disclosure, since the graphic object 400 included in the plurality of images is extracted, the plurality of images are combined, and the extracted graphic object is matched to the combined images, whereby an image in which portions, excluding the extracted graphic object, are outfocussed can be generated.

In addition, the particular graphic object 400 included in the generated image may be different (or changed) according to an image from which the particular graphic object is extracted, among a plurality of images. That is, the particular graphic object may be varied as a subject corresponding to the particular graphic object 400 moves, while continuous image capturing is performed. For example, as illustrated in (a) of FIG. 7B, particular graphic objects 400a, 400b, and 400c may be different according to a movement while a plurality of images are being captured. The plurality of captured images 300, 310b, and 310c may be output on the display unit 151. Here, in order to guide the graphic objects 400a, 400b, and 400c which may be focused; the controller 180 can shade the graphic objects 400a, 400b, and 400c.

Here, an out of focus image may be generated based on the image 300 obtained by capturing a preview image which has been output on the display unit was captured while the plurality of images are being captured. Here, when a touch is applied to the graphic object 400b included in the image 310b among the plurality of images 300, 310b, and 310c, the controller 180 can extract the graphic object 400b to which the touch has been applied. Thereafter, as illustrated in (b) of FIG. 7B, the controller 180 can match the extracted graphic object 400b to the position of the graphic object 400a included in the image 300 obtained by capturing the preview image, thus generating the out of focus image 500. Accordingly, the user may select a graphic object in a desired shape.

Meanwhile, the out of focus image may be any image among the plurality of images. As illustrated in (a) of FIG. 7B, when a touch is applied to a region, excluding the graphic object 400c included in the image 310c among the plurality of images, the controller 180 can generate the out of focus image 500 based on the image 310c as illustrated in (c) of FIG. 7B.

As described above, in an embodiment of the present disclosure, a graphic object to be focused may be changed in various manners, and outfocussing may be performed based on an image desired by the user. Thus, the present disclosure may provide an optimal GUI allowing for generating an out of focus image by using the mobile terminal 100.

According to an embodiment of the present disclosure, a plurality of images may be captured by using a single camera, and an out of focus image can be provided by using the plurality of images. Thus, since a plurality of cameras or an IR sensor are not required to capture an out of focus image, the cost can be reduced.

Also, according to an embodiment of the present disclosure, since a high-priced lens is not required to capture an image with a thin depth of field, an out of focus image can be provided by using an existing camera provided in a mobile terminal 100. Also, according to an embodiment of the present disclosure, an optical GUI allowing for selecting a portion to be focused can be provided through a preview image input through a camera. Thus, an image in which a portion (subject) desired by the user is focused and other portions are out of focus can be generated.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display unit;
a camera configured to change an angle when a body of the mobile terminal is fixed; and
a controller configured to:
control the camera to capture a plurality of images while changing the camera at preset angles with respect to the body of the mobile terminal when the body is fixed to capture the plurality of images different from each other in response to an image capture request, wherein all of the plurality of images are not out-focused, and each of the plurality of images includes a particular graphic object corresponding to a specific subject, particular graphic objects corresponding to the specific subject and included in the plurality of images are displayed at different positions and have different poses,
wherein a first particular graphic object corresponding to the specific subject included in a first image among the plurality of images has a first pose and is displayed at a first position, and a second particular graphic object corresponding to the specific subject included in a second image among the plurality of images has a second pose different from the first pose and is displayed at a second position different from the first position,
control the display unit to simultaneously display the plurality of images including the particular graphic objects corresponding to the specific subject so that any one of the particular graphic objects corresponding to the specific subject having different positions and poses can be selected,
shade the particular graphic objects corresponding to the specific subject included in the plurality of images in order to guide the particular graphic objects to be focused,
when the first particular graphic object included in the first image is touched, extract the particular graphic objects from the plurality of images, synthesize the plurality of images from which the particular graphic objects are extracted and match the extracted first particular graphic object to the synthesized image to generate a first focused image focused on the first particular graphic object and another part is out-focused, and
when the second particular graphic object included in the second image is touched, extract the particular graphic objects from the plurality of images, synthesize the plurality of images from which the particular graphic objects are extracted and match the extracted second particular graphic object to the synthesized image to generate a second focused image focused on the second particular graphic object and another part is out-focused.

2. The mobile terminal of claim 1, wherein the controller is further configured to display a preview image input through the camera on the display unit, and
wherein the image capture request includes a preset type touch applied to a region in which the preview image is displayed.

3. The mobile terminal of claim 2, wherein when the preset type touch is applied to the particular graphic object included in the preview image, the controller is further configured to generate the image.

4. The mobile terminal of claim 2, wherein the controller is further configured to capture the plurality of images when the preview image input satisfies a preset condition, and
wherein the preset condition includes at least one of when a subject corresponding to at least one of graphic objects included in the preview image is within a preset distance and when at least one of the graphic objects included in the preview image is recognized as a face.

5. The mobile terminal of claim 4, wherein the controller is further configured to:
display an icon indicating that the preview image satisfies the preset condition on the display unit, and
capture the plurality of images in response to a touch applied to the icon.

6. The mobile terminal of claim 1, wherein the plurality of captured images are different from a preview image input through the camera.

7. The mobile terminal of claim 1, wherein the controller is further configured to display an indicator for inducing selection of the one particular graphic object.

8. A method of controlling a mobile terminal, the method comprising:
capturing, via a camera of the mobile terminal, a plurality of images while changing the camera at preset angles with respect to a body of the mobile terminal to capture the plurality of images different from each other in response to an image capture request, wherein the camera is configured to change an angle when the body of the mobile terminal is fixed, wherein all of the plurality of images are not out-focused, and each of the plurality of images includes a particular graphic object corresponding to a specific subject, particular graphic objects corresponding to the specific subject and included in the plurality of images are displayed at different positions and have different poses,
wherein a first particular graphic object corresponding to the specific subject included in a first image among the plurality of images has a first pose and is displayed at a first position, and a second particular graphic object corresponding to the specific subject included in a second image among the plurality of images has a second pose different from the first pose and is displayed at a second position different from the first position;
displaying simultaneously, via a display unit of the mobile terminal, the plurality of images including the particular graphic objects corresponding to the specific subject so that any one of the particular graphic objects corresponding to the specific subject having different positions and poses can be selected;
shading, via the controller of the mobile terminal, the particular graphic objects corresponding to the specific subject included in the plurality of images in order to guide the particular graphic objects to be focused;
when the first particular graphic object included in the first image is touched, extracting the particular graphic objects from the plurality of images, synthesizing the plurality of images from which the particular graphic objects are extracted and matching the extracted first particular graphic object to the synthesized image to generate a first focused image focused on the first particular graphic object and another part is out-focused; and
when the second particular graphic object included in the second image is touched, extracting the particular graphic objects from the plurality of images, synthesizing the plurality of images from which the particular graphic objects are extracted and matching the extracted second particular graphic object to the synthesized image to generate a second focused image focused on the second particular graphic object and another part is out-focused.

9. The method of claim 8, further comprising:
displaying a preview image input through the camera on the display unit of the mobile terminal,
wherein the image capture request includes a preset type touch applied to a region in which the preview image is displayed.

10. The method of claim 9, wherein when the preset type touch is applied to the particular graphic object included in the preview image, the generating step generates the image.

11. The method of claim 9, further comprising:
capturing the plurality of images when the preview image input satisfies a preset condition,
wherein the preset condition includes at least one of when a subject corresponding to at least one of graphic objects included in the preview image is within a preset distance and when at least one of the graphic objects included in the preview image is recognized as a face.

12. The method of claim 11, further comprising:
displaying an icon indicating that the preview image satisfies the preset condition on the display unit; and
capturing the plurality of images in response to a touch applied to the icon.

13. The method of claim 8, wherein the plurality of captured images are different from a preview image input through the camera.

14. The method of claim 8, further comprising:
displaying an indicator for inducing selection of the one particular graphic object.

* * * * *